Oct. 30, 1956 E. F. KLESSIG ET AL 2,768,582
POWER TRANSMISSION
Filed July 26, 1952

INVENTORS
ERNST F. KLESSIG
GLENN M. JONES
BY
Ralph L. Tweedale
ATTORNEY

United States Patent Office 2,768,582
Patented Oct. 30, 1956

2,768,582

POWER TRANSMISSION

Ernst F. Klessig, Berkley, and Glenn M. Jones, Farmington, Mich., assignors to Vickers Incorporated, Detroit, Mich., a corporation of Michigan Application July 26, 1952, Serial No. 301,134

13 Claims. (Cl. 103—42)

This invention relates to power transmissions and is particularly applicable to those of the type comprising two or more fluid pressure energy translating devices, one of which may function as a pump and another as a fluid motor.

The invention is generally concerned with such units which are equipped with flow control valves and more particularly with flow control valves of the excess discharge type which in cooperating with a pilot relief valve also perform as a main pressure relief valve.

A flow control valve of the excess discharge type which also performs as a main pressure relief valve is illustrated in the patent to Vickers, 2,102,865. The flow control device therein illustrated comprises a body member having a flow passage and mounted in series in said passage a pressure compensating valve and a throttle. The compensating valve is provided with opposed substantially balanced operating surfaces, one of which is exposed to pressure ahead of the throttle and the other of which is exposed to pressure beyond the throttle. The compensating valve controls a bypass from the main flow passage and the operating surfaces are responsive to the pressures ahead of and beyond the throttle to cause the valve to modulate and discharge excess fluid in order to maintain the pressure drop across the throttle constant. A spring tends to bias the valve to the closed position and the loading of said spring determines the pressure drop across the throttle. By maintaining a constant pressure drop across the throttle a constant regulated flow rate is established through the device.

The compensating valve is provided with a control chamber which may be vented by the operation of a pilot relief valve. At a predetermined pressure within the system the pilot relief valve is operated to the open position to vent the control chamber and cause the pressures acting on the opposed operating surfaces to become completely unbalanced. In this manner the pressure compensating valve opens completely and performs as a pressure relief valve in bypassing the complete displacement of the pump.

There is a definite need for flow control devices in the mobile equipment field, such as for example in hydraulic steering systems for automobiles, where it is desirable to utilize a fixed displacement pump with an auxiliary flow control device rather than a variable displacement pump because of the difference in cost to the consumer. Bulk, size, and weight requirements are radically different, however, in the mobile equipment field than in the industrial tool field. Installation problems also must be met that are different. It is vitally important that manufacturing costs be reduced to provide a product which the average consumer in this field is able to buy. Each machinery operation adds to the cost of the finished product.

It is therefore an object of this invention to provide an improved, simplified, efficient, and low cost flow regulating device which may also function as a pressure relief valve.

It is also an object of this invention to provide in a rotary fluid energy translating device of the type having a pressure plate adapted to be maintained in fluid sealing engagement against rotary working elements of the rotary device, a flow control device for regulating the displacement of the device and which also serves to maintain the pressure plate against the rotary working elements of the rotary device.

It is a further object of this invention to provide in a rotary device of the type mentioned an improved flow control device which not only performs the functions immediately above stated but which also serves as a pressure relief valve for the rotary fluid energy translating device.

It is still another object of this invention to provide an improved flow control device of the excess discharge type which also functions as a pressure relief valve through the medium of a pilot relief valve mounted completely within and carried by the pressure compensating valve of the flow control device.

Further objects and advantages of the present invention will be apparent from the following description, reference being had to the accompanying drawing wherein a preferred form of the present invention is clearly shown.

Figures 1, 2:
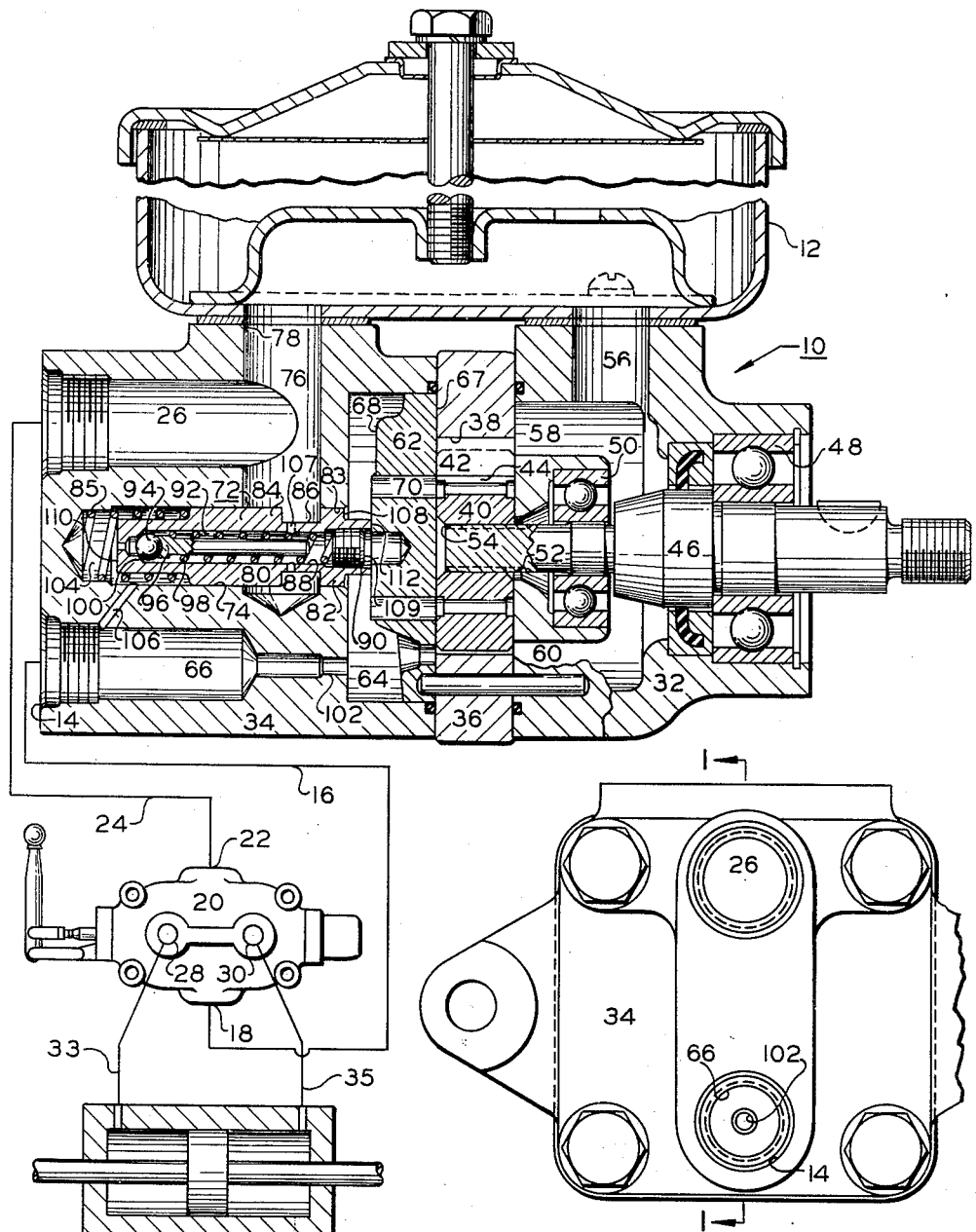
Figure 1 is a diagrammatic view of a hydraulic transmission system embodying a sectional view of a preferred form of the present invention taken on line 1—1 of Figure 2.
Figure 2 is an end view of the rotary vane pump shown in Figure 1.

Referring to the figures there is shown a hydraulic system having a rotary vane pump 10 which is supplied with fluid from a tank 12 mounted on the pump. The outlet or discharge port 14 of the pump 10 is connected by a conduit 16 to a pressure port 18 of a directional control valve 20. A return port 22 of the valve 20 is connected by a conduit 24 to a return passage 26 in the pump 10. The valve 20 is connected by ports 28 and 30 to opposite ends of a motor 31 adapted for driving a load device, not shown, by means of conduits 33 and 35.

Referring to the pump 10, the basic construction of the device is of the type illustrated in the patent to Gardiner et al., 2,544,988. The body of the pump 10 comprises a main head or inlet section 32, an outlet head section 34, and sandwiched between the inlet and outlet sections a cam ring 36. The cam ring 36 has an inner noncircular contour 38 mounted within which is a rotor 40 carrying a plurality of vanes 42, reciprocating in vane slots 44. A drive shaft 46 mounted in bearings 48 and 50 within the inlet section is externally splined at 52 to mate with internal splines 54 of the rotor 40. The drive shaft 46 extends from the inlet section 32 and may be driven, for example, from the engine of a vehicle.

In pumps of the type illustrated, opposed working chambers are formed by the rotor and cam ring. The working chambers may appropriately be divided into fluid inlet zones and fluid outlet zones. An inlet passage 56 connects the fluid supply in the tank 12 by means of branches 58 and 60 to the diametrically opposed fluid inlet zones, not shown. The diametrically opposed fluid outlet zones are connected by passages, none of which are shown, which extend through a pressure plate 62 to a pressure chamber 64. The pressure chamber 64 is formed in the outlet section 34 and an outlet or discharge passage 66 leads directly from the pressure chamber 64. The pressure plate 62 is floatably mounted in the chamber 64 and a surface on the side thereof indicated by the numeral 67 is adapted to be maintained during normal operation against the ring and in fluid sealing engagement with the rotor by pressure in the chamber acting against the surface on the opposite side of the plate indicated by the numeral 68. A plurality of passages 70 extend through the pressure plate to the underside of the vane slots 44 for the purpose of pressure operating the ends of the vanes in engagement against the inner surface 38 of the cam ring 36 which forms a track for the vanes.

The flow control device indicated generally by the numeral 72 is mounted within a blind bore 74 in the outlet section 34 and which opens to the pressure chambers 64. A bypass passage 76 is formed in the outlet section 34 which is transverse to the valve bore 74 and intersects the same. It also intersects the return passage 26 and has an opening 78 connecting the passage to the tank 12.

The flow control device 72 comprises a piston 80 mounted in the bore 74. The piston 80 is provided with a land 82 slidable in that portion of bore 74 nearest the pressure chamber 64 within a sealing area denoted by the numeral 83, and also provided with a larger land 84, the greater portion of which is slidable in that portion of the bore 74 beyond the bypass passage 76. A groove 86 is formed between the lands 82 and 84. The land 82 operates as a pressure compensating valve by controlling excess flow and bypassing said flow from the pressure chamber 64 to the bypass passage 76. A spring 85 mounted in the bore 74 abuts the wall formed at one end of the bore 74 and abuts one end of the land 84 to bias the piston 80 to the position shown so that the land or valve 82 closes communication between the pressure chamber 64 and the bypass passage 76.

The piston 80 is provided with a stepped bore 88 which is closed at the compensating valve end thereof by a plug 90 and thereby forming a chamber 92 for mounting pilot relief valve mechanism. The pilot relief valve mechanism cooperates with the compensating valve to cause the latter to also act as a main relief valve. Its purpose is to vent the control chamber in order to cause an unbalancing of pressure forces on the operating surfaces of the compensating valve. The compensating valve then fully connects the bypass to the flow passage and the total pump displacement is bypassed. The pilot valve mechanism comprises a poppet valve 94, a retainer 96, and a spring 98. The poppet valve 94 guided by the retainer 96 is maintained by action of the spring 98 on a seat 100 formed in the stepped bore 88.

The loading of the spring 85 determines the pressure drop to be maintained across a fixed restriction or throttle 102 formed in the outlet passage 66 of the pump while the spring 98 determines the pressure at which the compensating valve operates as a main relief valve. The outlet passage 66 is connected beyond the restriction 102 to a control chamber 104 in the valve bore 74 by a restricted cross passage 106.

It is this chamber which is adapted to be vented by the pilot valve to the tank at a predetermined pressure to cause unbalancing of pressure forces on opposed operating surfaces of the compensating valve and cause the compensating valve to perform as a relief valve to completely bypass pump flow. When the pilot valve 94 is operated to the open position the control chamber 104 is vented to tank 12 through the chamber 92 and a plurality of transverse ports 107 in the piston 80 which open to the bypass passage 76.

One of the operating surfaces comprises a surface on land 82 indicated by the numeral 108 and the surface at the end of the piston 80 indicated by the numeral 109. The surface area of the plug may be considered as the piston end surface area. The total area of these surfaces is exposed to pressure in the pressure chamber 64. The other operating surface comprises the left end surface of piston 80, the surface of land 84 facing the control chamber and a portion of the popet valve 94, said total operating surface, for the purpose of convenience, being indicated by the numeral 110. It is apparent that the total area of the operating surfaces 108 and 109 is exposed to pressure ahead of the restriction 102 while the total area of the other surface 110 is exposed to pressure in the outlet passage 66 beyond the restriction 102. There is thus formed substantially balanced and opposed operating surfaces for the compensating valve which are exposed to the pressures ahead of and beyond the throttle or restriction.

In the position shown the spring 85 which determines the pressure drop across the restriction 102 also biases one end of the piston 80, which is indicated by the numeral 112, against the center portion of the pressure plate surface 68. When the pump is started it is essential that the pressure plate be maintained in sealing engagement against the rotor to prevent free wheeling. The spring 85 and piston 80 thus cooperate to maintain this proper engagement. When the pump is in operation and being driven at a speed to displace fluid in quantity sufficient to cause the restriction 102 to become effective, the compensating valve constantly modulates between the fully open and closed position so that the end of the piston no longer is maintained in engagement against the plate. However, this is unnecessary during pump operation because the pressure plate is now maintained in engagement by pressure in the pressure chamber.

In operation, fluid is supplied from the tank 12 to the inlet passage 56 and branches 58 and 60 to the inlet zones of the pump, and the pump discharges fluid through the fluid outlet zones and the porting in the pressure plate 62 to the pressure chamber 64. From the pressure chamber 64 fluid is conducted through the outlet passage 66 and outlet port 14 of the pump and by conduit 16 to the pressure port 18 of the directional control valve 20. In one position of operation of the valve 20 fluid will be conducted through motor port 28 and conduit 33 to the left end of the motor 31 and fluid displaced from the right end of the motor will be conducted by conduit 35 to motor port 30 of valve 20 and through port 22 of said valve to the return passage 26 of the pump 10. Fluid returns to the tank 12 by means of passage 76 and opening 78.

The speed of the motor 31 will be regulated by the flow control device mounted within the pump in the following manner. The operating surfaces 108 and 109 of the piston 80 will be exposed to pressure in the pressure chamber 64, the latter of which forms a continuous outlet passage together with passage 66. This total effective surface area is thus exposed to pressure in the outlet passage ahead of the restriction 102. The other operating surface area comprising one end of piston 80, the surface on land 84 facing the control chamber, and a portion of the poppet valve 94 are exposed to pressure in the outlet passage 66 beyond the restriction 102 by means of the cross passage 106 leading to the control chamber 104.

Although the spring 85 tends to bias the pressure compensating valve 82 to the closed position it is operated to the open position and modulates constantly to discharge a portion of the pump displacement. As the operating surface 108 of the compensating valve 82 passes through the sealing surface 83 and the opening of the bypass passage 76 to the bore 74, a portion of the pump displacement passing through the pressure chamber is permitted to flow to the bypass passage 76 and thence to tank 12. The amount bypassed is dependent upon the size or area of the restriction 102 and the loading of the spring 85. When the motor 31 has reached its operational movement in one direction pressure in the system will immediately increase and the pilot relief valve will cause the compensating valve to perform the function of a main system relief valve. At any other time when the system pressure increases to a point beyond the loading of spring 98 the same operation will occur.

When the system pressure increases beyond the loading of spring 98 the poppet valve 94 is pressure operated from the seat 100. The control chamber 104 is then vented to tank 12 through the open seat 100, chamber 92, transverse ports 107, bypass passage 76, and opening 78. Due to the restricted passage 106 pressure fluid is exhausted faster through the pilot valve seat opening, then it may be replaced in the control chamber 104 and an immediate unbalancing of the pressure forces on the opposing operating surfaces of the compensating valve 82 occurs. The compensating valve 82 together with the piston is then operated to completely open communication between the pressure chamber 64 and the bypass passage 76 and the total pump displacement will be completely bypassed to tank 12.

When the pump is stopped the spring 85 will again bias the piston 80 so that one end thereof engages the pressure plate in a manner to maintain the pressure plate in fluid sealing engagement against the ring 36 and motor 40. Thus when the pump is started in operation the pressure plate is in proper sealing engagement to permit the pump to come up to operating conditions.

The present invention provides all of the features and operates as efficiently as former types of flow control devices. However, it has been greatly simplified resulting in lower manufacturing costs.

It is particularly adapted for mounting within pumps utilized in the mobile equipment field. The invention is space saving in comparison to former flow control devices.

It lowers manufacturing costs by eliminating mounting bores and extra passages and lowers the bulk and weight of the finished product. As already mentioned, these features are important in the mobile equipment field where size, weight, bulk, and machining operations contribute to final cost of the product. Installation requirements are also greatly simplified. When mounted within rotary pumps of the type having a pressure plate adapted to be maintained in fluid sealing engagement against the rotor of the pump it serves another very useful purpose. It eliminates the use of a separate biasing element, such as a spring, utilized for maintaining the plate in engagement against the rotor at starting of the pump.

Formerly in flow control valves of this type where the device was also to function as a relief valve, a pilot relief valve was mounted apart from the compensating valve. The pilot valve was either separately mounted in the body member housing the compensating valve or it was provided with a separate body and located in the circuit apart from the main valve.

Applicant provides a bore for mounting the compensating valve which intersects the pressure chamber. Applicant also provides a stepped bore in the piston of the flow control device and mounts the pilot valve in the bore. This eliminates extra mounting bores and passages interconnecting the pilot valve to the flow control valve and to its interrelated passages. The arrangement conserves space and eliminates extra machining operations and manufacturing costs. Although the flow control device has been illustrated as being mounted in a rotary vane pump, it may be utilized separately in hydraulic systems by providing a body therefor having the same basic flow passages disclosed in the head of the pump.

It should also be noted that the flow control device performs three functions when mounted in any form of rotary pump having a pressure plate to be maintained against rotary working elements of the pump. The device performs the function of regulating flow rate and also performs as a system relief valve. Also, when mounted in pumps of the type recited the flow control device performs the function of maintaining the pressure or cheek plate in proper engagement with the rotor of the pump. The same resilient biasing means which controls the pressure drop across the throttle of the device also serves to bias the compensating valve against the pressure plate to maintain the latter in fluid sealing engagement against the rotor of the pump at starting of said pump and when the displacement of said pump is lower than the setting of said throttle.

While the form of embodiment of the invention as herein disclosed constitutes a preferred form, it is to be understood that other forms might be adopted, all coming within the scope of the claims which follow.

What is claimed is as follows:

1. A combined flow control and pressure relief valve comprising a body having a flow passage and a by-pass leading therefrom, a throttle in the flow passage, a pressure compensating valve of the excess discharge type shiftably mounted in the body and including pressure responsive operating means forming a control chamber connected to the flow passage, said operating means being responsive to the pressures ahead of and beyond the throttle for causing the compensating valve to control the by-pass in a manner to maintain a constant pressure drop across the throttle and thus maintain a constant regulated flow rate through the flow passage, said compensating valve being operable to a position fully connecting the by-pass to the flow passage when the control chamber is vented, a control passage in the compensating valve opening to the control chamber and to the by-pass, a valve seat in the passage, a pilot valve in the control passage including a pressure responsive operating surface, said pilot valve being urged on said seat to normally close the control passage, and said pilot valve operating surface being responsive at predetermined pressure increases in the control chamber to vent said chamber completely through the compensating valve to the by-pass.

2. A combined flow control and pressure relief valve comprising a body member having a flow passage and a by-pass leading therefrom, a throttle in the flow passage, a pressure compensating valve of the excess discharge type shiftably mounted in the body and forming a control chamber connected to the flow passage, said compensating valve comprising a piston having opposed substantially balanced operating surfaces exposed to the pressures ahead of and beyond the throttle and responsive thereto for controlling the by-pass in a manner to maintain a constant pressure drop across the throttle and thus maintain a constant regulated flow rate through the flow passage, said compensating valve being operable to a position fully connecting the by-pass to the flow passage when the control chamber is vented, a control passage completely within the piston and opening to the control chamber and to the by-pass, and a pilot relief valve mounted in the control passage resiliently biased to a position closing the control chamber from the by-pass, said pilot relief valve having an operating surface exposed to pressure in the control chamber and responsive at predetermined pressure increases in the control chamber for causing the pilot relief valve to vent said chamber to the by-pass completely through the control passage of the piston.

3. In a rotary pump comprising a stator having an inlet supply passage and a delivery passage, a rotor mounted in the stator and a pressure plate floatably mounted in the stator immediately adjacent the rotor, the combination of a flow control valve shiftably mounted in the stator for regulating the flow rate through the delivery passage, said valve being biased to a position engaging the pressure plate and urging the pressure plate in fluid sealing engagement against the rotor.

4. In a rotary pump comprising a stator having an inlet supply passage and a delivery passage, a rotor mounted in the stator and a pressure plate floatably mounted in the stator immediately adjacent the rotor, the combination of a throttle in the delivery passage, a pressure compensating valve of the excess discharge type shiftably mounted in the stator and responsive to the pressures ahead of and beyond the throttle for maintaining a regulated flow rate through the delivery passage, said compensating valve including resilient biasing means controlling the pressure drop across the throttle and said resilient means also biasing the valve in engagement against the pressure plate and urging the pressure plate in fluid sealing engagement against the rotor.

5. In a rotary pump comprising a stator having an inlet supply passage and a delivery passage, a pressure delivery chamber connected to the delivery passage, a rotor mounted in the stator immediately adjacent the chamber and a pressure plate floatably mounted in the chamber maintained by the pressure existing in said chamber in fluid sealing engagement against the rotor, the combination therewith of a throttle in the delivery passage, and a pressure compensating valve of the excess discharge type shiftably mounted in the stator and extending into the pressure chamber, said valve being responsive to the pressures ahead of and beyond the throttle for maintaining a constant pressure drop across the throttle and thus maintaining a constant regulated flow rate through the delivery passage, said compensating valve including resilient biasing means determining the pressure drop across the throttle and also biasing the compensating valve in engagement against the pressure plate to urge the pressure plate in fluid sealing engagement against the rotor.

6. In a rotary pump comprising a stator, a rotor mounted in the stator, a pressure chamber in the stator at one side of and immediately adjacent the rotor and a pressure plate floatably mounted in the chamber, one side of which is adapted to be maintained in fluid sealing engagement against the rotor, the combination of a flow control valve shiftably mounted in the stator, one portion of which extends into the pressure chamber, and resilient biasing operating means for the flow control valve also urging the valve against the other side of the pressure plate to urge the plate in fluid sealing engagement against the rotor.

7. In a rotary pump comprising a stator having an inlet supply passage and a pressure delivery passage, a rotor mounted in the stator, a pressure chamber in the stator at one side of and immediately adjacent the rotor and a pressure plate floatably mounted in the chamber, one side of which is adapted to be maintained in fluid sealing engagement against the rotor, the combination of a throttle in the outlet passage, a bore in the stator perpendicular to the chamber and opening thereto, a pressure compensating valve shiftably mounted in the bore responsive to the pressures ahead of and beyond the throttle for maintaining a regulated flow rate through the pressure delivery passage, said compensating valve extending into the pressure chamber and including resilient biasing means urging the valve to the fully closed position and in engagement with the other side of the pressure plate to urge the first mentioned side of said plate in fluid sealing engagement against the rotor.

8. In a rotary pump comprising a stator, a rotor mounted in the stator and forming a fluid inlet zone and a fluid outlet zone respectively connected to an inlet passage and an outlet passage, and a pressure plate floatably mounted in the stator immediately adjacent the rotor adapted to be maintained in fluid sealing engagement against the rotor, a flow control device mounted in the stator comprising a pressure compensating valve of the excess discharge type and a throttle in the outlet passage, said compensating valve being responsive to the pressures ahead of and beyond the throttle for maintaining a constant pressure drop across the throttle and thus maintaining a regulated flow rate through the outlet passage, said compensating valve including resilient biasing means determining the pressure drop across the throttle, and said compensating valve being mounted in the stator in a manner that the resilient biasing means urges the compensating valve against the pressure plate to maintain said plate in fluid sealing engagement against the rotor when the compensating valve is inoperative.

9. In a rotary pump comprising a stator having an inlet supply passage and a delivery passage and a rotor mounted in the stator, the combination of a by-pass leading from the delivery passage, a throttle in the delivery passage, a pressure compensating valve of the excess discharge type normally blocking the by-pass and shiftably mounted in the stator, said pressure compensating valve being responsive to the pressures ahead of and beyond the throttle for maintaining a regulated flow rate through the throttle, said compensating valve including a control chamber which when vented causes the compensating valve to fully connect the by-pass to the delivery passage, and a pilot relief valve mounted completely in the compensating valve and responsive to predetermined pressure increases in the control chamber for venting the control chamber to the by-pass completely through the compensating valve.

10. In a rotary pump comprising a stator having an inlet supply passage and a delivery passage, a rotor mounted in the stator, and a pressure plate floatably mounted in the stator immediately adjacent the rotor adapted to be maintained in fluid sealing engagement against the rotor, the combination of a by-pass leading from the delivery passage, a throttle in the delivery passage, a pressure compensating valve of the excess discharge type shiftably mounted in the stator and resiliently biased to a position engaging the pressure plate and urging said plate in fluid sealing engagement against the rotor, said compensating valve being responsive to the pressures ahead of and beyond the throttle for maintaining a regulated flow rate through the delivery passage and including a control chamber which when vented causes the valve to be operated to a position fully connecting the delivery passage to the by-pass, and a pilot relief valve mounted completely within the compensating valve responsive to predetermined pressure increases in the control chamber for venting the control chamber to the by-pass.

11. A combined flow control and pressure relief valve comprising: a body member having a flow passage and a by-pass leading therefrom; a throttle in the flow passage; a pressure compensating valve of the excess discharge type shiftably mounted in the body and comprising a shiftable valve member for controlling the by-pass, and operating means for the valve member hydraulically connected to the flow passage ahead of and beyond the throttle; said operating means forming with the body a control chamber which when vented affects the operating means for operating the valve member to fully connect the by-pass to the flow passage; and a pilot relief valve mounted completely within the compensating valve, said pilot relief valve comprising a valve member, and operating means associated therewith exposed to pressure in the control chamber; the pilot valve member normally closing communication between the control chamber and the by-pass and said pilot valve member operating means being responsive at a predetermined pressure in the control chamber to cause the pilot valve member to vent the control chamber to the by-pass completely through the compensating valve.

12. In a flow control valve comprising a body member and a pressure compensating valve shiftably mounted therein of the type which is operable to discard fluid from a flow passage to a by-pass in said body in quantities for maintaining a regulated flow rate through the flow passage, said compensating valve also being of the type having a control chamber which when vented causes the pressure forces acting on opposed substantially balanced operating surfaces of the valve which are connected to the flow passage to become unbalanced and causing the compensating valve to operate as a pressure relief valve, the combination of a control passage in the compensating valve connecting the control chamber to the by-pass, a pilot relief valve mounted completely within the control passage comprising a valve member resiliently biased to a position closing the control passage, and operating means associated with the valve member exposed to pressure in the control chamber and responsive to predetermined increases of pressure in said chamber for operating the pilot valve to open the control passage and thereby venting the control chamber to the by-pass completely through the compensating valve.

13. A combined flow control and pressure relief valve comprising a body member having a flow passage including a throttle therein and a by-pass leading from the flow passage, a pressure compensating valve of the excess discharge type shiftably mounted in the body, said pressure compensating valve comprising a shiftable valve member and operating means for the valve member comprising opposed, substantially balanced pressure operating surfaces, said operating means forming with the body a control chamber and said operating surfaces becoming unbalanced when the control chamber is vented causing the compensating valve member to be operated to a position fully connecting the flow passage to the by-pass, a control passage in the compensating valve opening to the by-pass and having a valve seat opening to the control chamber, a pilot valve member including pressure responsive operating means mounted in the control passage, said pilot valve member normally closing the seat and said pilot valve member operating means being exposed to pressure in the control chamber for operating said pilot valve member to vent said chamber through the control passage to the by-pass.

References Cited in the file of this patent

UNITED STATES PATENTS

| | | |
|---|---|---|
| 2,043,453 | Vickers | June 9, 1936 |
| 2,102,865 | Vickers | Dec. 21, 1937 |
| 2,360,816 | Pasco | Oct. 17, 1944 |
| 2,404,102 | Schultz | July 16, 1946 |
| 2,437,791 | Roth et al. | Mar. 16, 1948 |
| 2,473,953 | Huber | June 21, 1949 |
| 2,512,025 | Lauck | June 20, 1950 |
| 2,544,988 | Gardiner et al. | Mar. 13, 1951 |
| 2,571,154 | Mercier | Oct. 16, 1951 |
| 2,601,870 | Lee | July 1, 1952 |
| 2,639,725 | Albright | May 26, 1953 |

OTHER REFERENCES

Serial No. 404,526, Kleeberger (A. P. C.), published May 11, 1943.